United States Patent [19]

Nakamura

[11] Patent Number: 4,711,008
[45] Date of Patent: Dec. 8, 1987

[54] METHOD OF PRODUCING PROPELLER SHAFTS FOR JET-PROPELLED SMALL-SIZED BOATS

[76] Inventor: Yukio Nakamura, 3-19, 1-Chome, Tengachayakita, Nishinari-Ku, Osaka-Shi, Osaka-Fu, Japan

[21] Appl. No.: 943,399

[22] Filed: Dec. 19, 1986

[51] Int. Cl.[4] .................. B21K 23/00; B21K 1/06; B21K 3/00; F16C 3/00
[52] U.S. Cl. ........................ 29/156.8 P; 29/428; 29/DIG. 48; 228/112; 464/183
[58] Field of Search .......... 29/156.8 P, 428, DIG. 48; 74/11, 15.2; 228/112, 113, 114; 301/126; 464/179, 183

[56] References Cited

U.S. PATENT DOCUMENTS

| | | | |
|---|---|---|---|
| 1,967,487 | 7/1934 | Waisner | 29/156.8 P |
| 3,234,646 | 2/1966 | Hollander et al. | 228/113 |
| 4,127,080 | 11/1978 | Lakiza et al. | 464/183 X |
| 4,518,370 | 5/1985 | Orain | 464/183 X |
| 4,527,978 | 7/1985 | Zackrisson | 464/183 |
| 4,659,005 | 4/1987 | Spindler | 228/112 |

FOREIGN PATENT DOCUMENTS

| | | |
|---|---|---|
| 3346056 | 7/1984 | Fed. Rep. of Germany ...... 228/112 |
| 53-12114 | 4/1978 | Japan . |
| 53-12115 | 4/1978 | Japan . |
| 53-21197 | 6/1978 | Japan . |
| 59-41197 | 11/1984 | Japan . |

Primary Examiner—Howard N. Goldberg
Assistant Examiner—Ronald S. Wallace
Attorney, Agent, or Firm—Armstrong, Nikaido, Marmelstein & Kubovcik

[57] ABSTRACT

A method of producing propeller shafts for jet-propelled small-sized boats comprises the steps of preparing a main shaft in the form of a hollow round bar, which is a finished part and a pair of auxiliary shafts shorter in length than the main shaft, in the form of solid round bars, which are roughly shaped parts, connecting and integrating the pair of auxiliary shafts with the opposite cut ends of the main shaft by the friction welding process utilizing heat of friction produced by relative pressurized rubbing movement between the parts, and, with the main shaft, which is a finished part, used as a standard, machining the surfaces of the auxiliary shafts, which are roughly shaped parts, to form mount surfaces for fitting thereon such parts as oils seals, bearings, and a propeller.

1 Claim, 7 Drawing Figures

FIG. 4 (1)
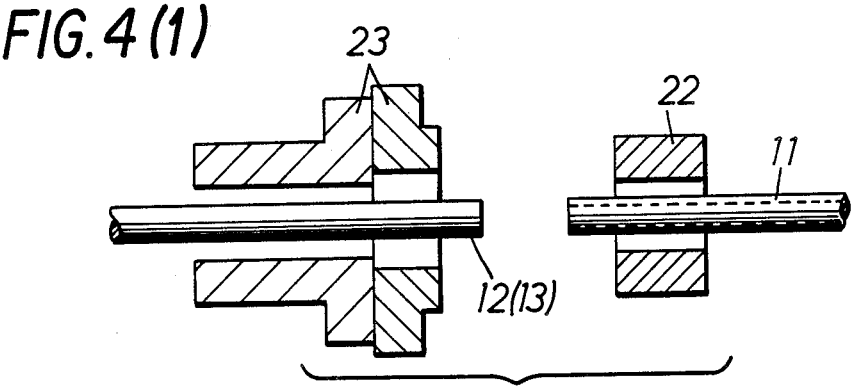
FIG. 4 (2)
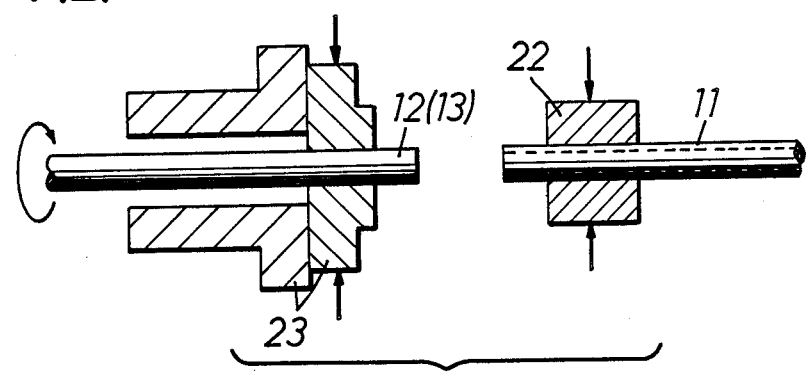
FIG. 4 (3)
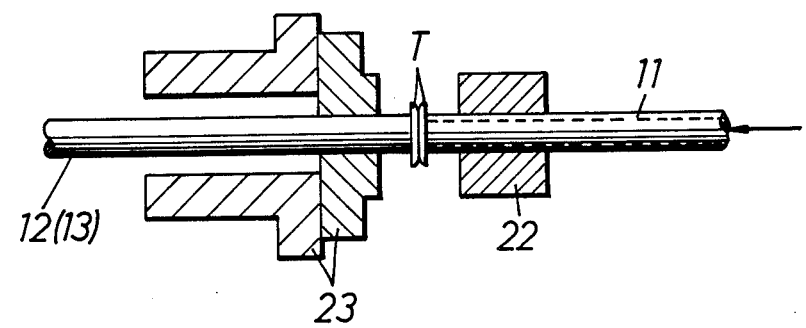

METHOD OF PRODUCING PROPELLER SHAFTS FOR JET-PROPELLED SMALL-SIZED BOATS

BACKGROUND OF THE INVENTION

Jet-propelled small-sized boats of the type in which a single person is allowed to ride the boat in a standing posture on the floor deck at the stern while steering the boat for gliding freely over water surface have already been known, as found, for example, in Japanese Patent Publication Nos. 12114/1978, 12115/1978, 21197/1978, and 21197/1978 and Japanese Utility Model Publication No. 41197/1984. However, in each of these known boats, the propeller shaft for rotatively driving the propeller by the engine mounted on the boat is in the form of a simple, solid metallic round bar, which is unsuitable from the standpoint of the object of making the boat lightweight and increasing buoyancy.

It can be said that it is effective in achieving the above object to make most of the lengthwise intermediate portion of the propeller shaft in hollow construction, provided that the rotative power of the engine can be properly transmitted to the propeller shaft and that the required strength and stability of the bearing regions of the propeller shaft can retained.

SUMMARY OF THE INVENTION

The present invention is intended to provide a method of producing a propeller shaft which responds to such desire. A first object of the invention is to provide an arrangement wherein in producing a propeller shaft, a hollow round main shaft which is a finished part and a pair of solid round auxiliary shafts which are shorter in length than said main shaft are prepared, and said pair of auxiliary shafts are connected to the opposite cut ends of said main shaft and integrated therewith by the friction welding process, thereby making hollow the intermediate portion, which is the greater part, of the propeller shaft, so as to make the propeller shaft lightweight while preventing entry of water into the hollow space of the propeller shaft.

A second object of the invention is to provide an arrangement wherein upon completion of said connection, with the main shaft, which is a finished part, used as a standard for machining, the surfaces of the auxiliary shafts, which are roughly-shaped parts, are machined to form mount surfaces for fitting such parts as oil seals, bearings and a propeller, whereby off-center or changes in wall thickness are prevented from occurring upon completion of said connection; thus, a propeller shaft superior in dimensional accuracy and in bearing strength can be obtained. Other objects of the invention will become apparent from the concrete arrangement and embodiment of the invention to be described below.

BRIEF DESCRIPTION OF THE DRAWINGS

FIG. 4 (I) through (III) is an explanatory view showing steps of connection of parts.

DESCRIPTION OF THE PREFERRED EMBODIMENTS

Figure 1:
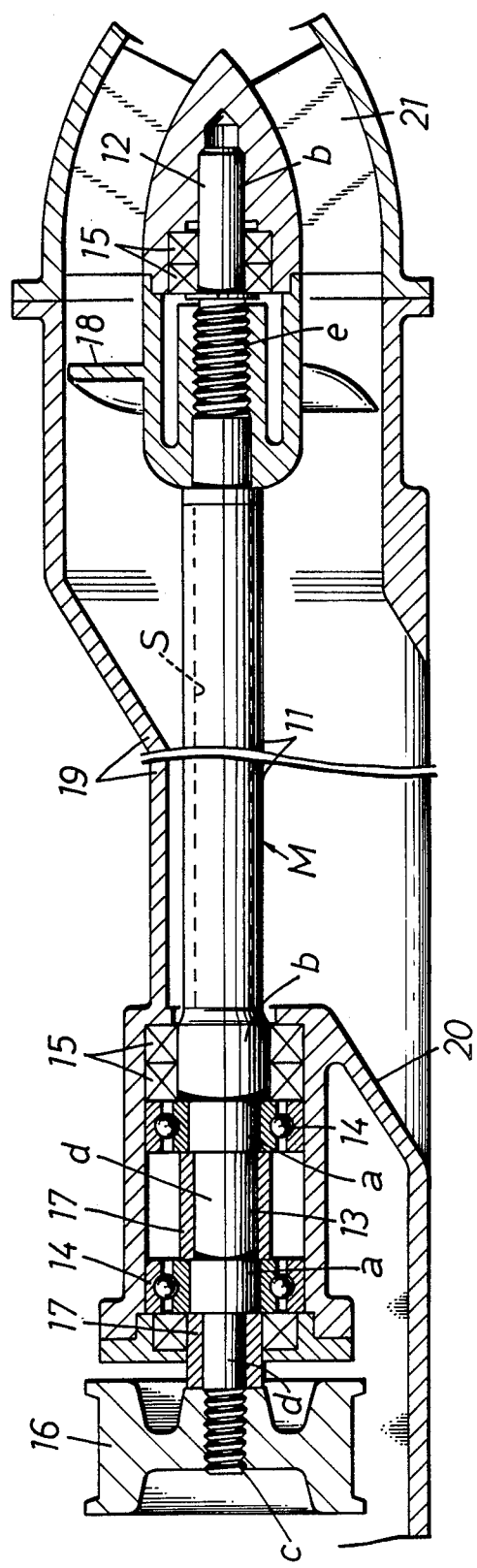
FIG. 1 is a sectional view, partly broken away, showing how a propeller shaft produced by the invention is used.
Figure 2:
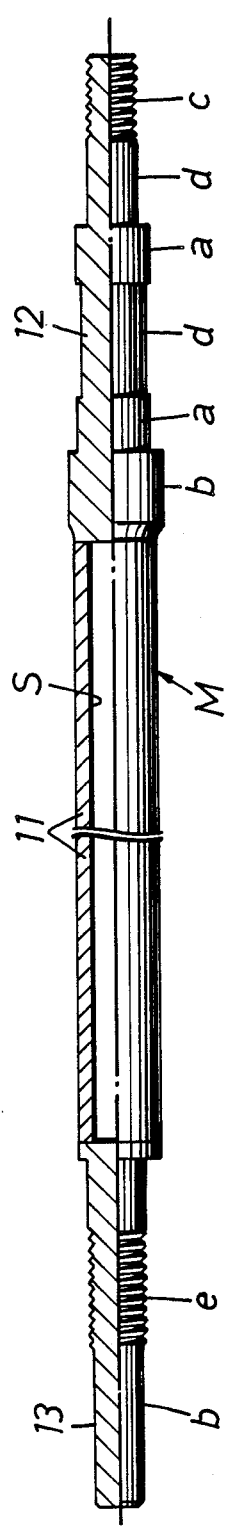
FIG. 2 is a half-sectional view showing said propeller shaft alone.

The invention will now be described in more detail with reference to the drawings. FIGS. 1 and 2 show a propeller shaft M for a jet-propelled small sized boat and the way it is used. The numeral 11 denotes a fixed length of main shaft in the form of a hollow round bar, using stainless steel as the material. The numerals 12 and 13 denote a pair of auxiliary shafts in the form of solid round bars, connected to the opposite cut ends of said main shaft 11 and integrated therewith, whereby a hollow space S in the main shaft 11 is closed against entry of water.

The auxiliary shafts 12 and 13 are shorter in length than the main shaft 11 and made of stainless steel, the same material as that for the main shaft 11. The surfaces of said auxiliary shafts are machined to form mount surfaces a, b, c, d and e for fitting thereon such parts as bearings 14, oil seals 15, a pulley 16 and a propeller 18. As for the mount surfaces c and e, threads and splines are, of course, included, as suggested by the figures. In addition, the numeral 19 denotes a boat frame forming a suction duct 20, and 21 denotes guide vanes.

The connection and integration of said main shaft 11 and auxiliary shafts 12 and 13 are effected, in the present invention, by the following friction welding process.

Figure 3:
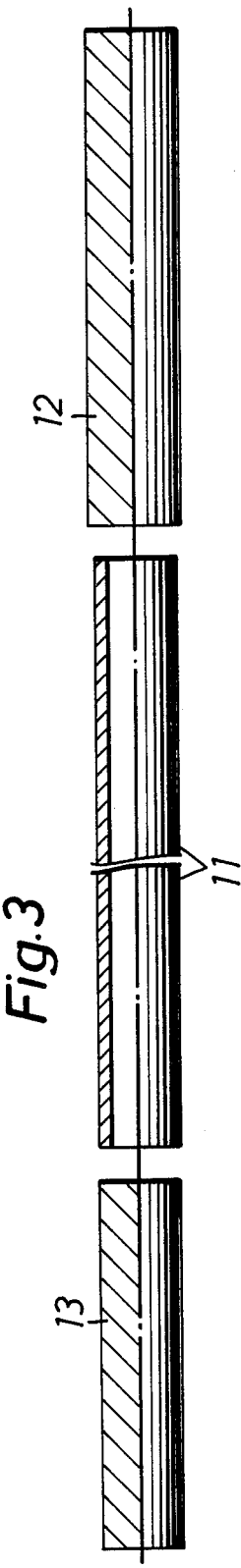
FIG. 3 is a half-sectional view showing a preparatory state prior to connection of parts.

In connecting them together, first, the finished part, or the hollow round main shaft 11, and the pair of roughly shaped parts, or the auxiliary solid round shafts 12 and 13, are prepared, as shown in FIG. 3, and then, as shown in FIG. 4 (I), the hollow main shaft 11 is inserted in a movable block 22 on the stationary side and set therein, while one solid auxiliary shaft 12 is inserted in a fixed block 23 on the rotative side and set therein. In this case, it goes without saying that the auxiliary shaft 12 is maintained coaxial with the main shaft 11, or the finished part, with the latter used as a standard.

After the main and auxiliary shafts 11 and 12 have been clamped in the movable and fixed blocks 22 and 23, respectively, as shown in FIG. 4 (II), the solid auxiliary shaft 12 is rotated at high speed by the fixed block 23, during which rotation the movable block 22 is advanced to press the cut end of the hollow main shaft 11 against the cut end of the auxiliary shaft 12, as shown in FIG. 4 (III).

The idea is to press the cut end of the hollow main shaft 11 against the cut end of the solid auxiliary shaft 12 during rotation of the latter so as to produce heat of friction by which the two shaft 11 and 12 are welded together end to end. Similarly, the other solid auxiliary shaft 13 is also connected and integrated with the main shaft 11. In this case, the method of controlling the friction welding cycle may be by controlling the pressure with time or by controlling the pressure in accordance with the upsetting rate. The allowance for relative axial movement of the two shafts 11 and 12 or 13 is suitably set, of course.

Figure 5:
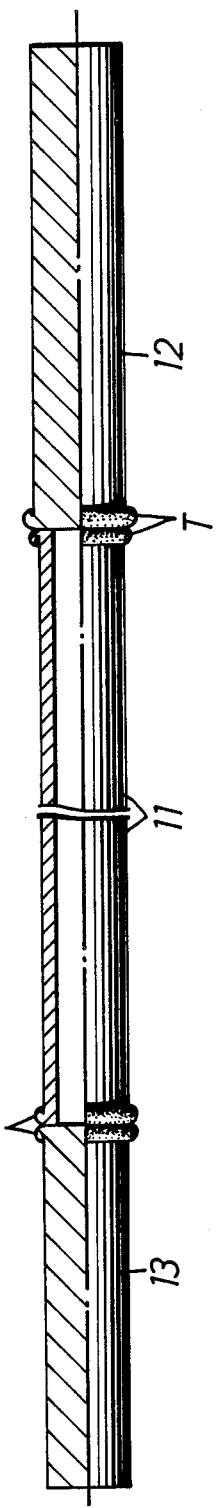
FIG. 5 is a half-sectional view showing the completed state of connection of parts.

The connected and integrated state is as shown in FIG. 5. Removal of burrs T formed on the friction welded regions is effected also with the main shaft 11, which is the finished part, used as a standard. Since the main shaft 11 has a finished surface and controlled wall thickness as a finished part, alignment of the auxiliary shafts 12 and 13 with the main shaft can be easily and accurately effected. As compared with the flush butt welding process, the friction welding process has no possibility of causing a strain due to off-center or a change in wall thickness. In this sense, a propeller shaft M which is superior in dimensional accuracy and in strength can be produced.

After the pair of solid auxiliary shafts 12 and 13 have been connected and integrated with the hollow main shaft 11, the surfaces of the auxiliary shafts 12 and 13, which are still in the roughly shaped state, are finished as on a lathe to change the FIG. 5 state to the FIG. 2 state, providing parts-mounting surfaces a, b, c, d, and e, as described above. In that case, since the main shaft 11 is a finished part, it can be used as a standard for forming highly accurate mount surfaces a, b, c, d and e.

As has so far been described, according to the present invention, in producing a propeller shaft M for a jet-propelled small-sized boat, a hollow round main shaft 11, which is a finished part, and a pair of solid round auxiliary shafts 12 and 13, which are roughly shaped parts, are prepared in advance, and the pair of auxiliary shafts 12 and 13 are connected and integrated with the cut ends of the main shaft 11 by the friction welding process utilizing heat of friction produced by relative pressurized rubbing movement between the parts, whereupon with said finished part, or the main shaft 11 used as a standard, the surfaces of the auxiliary shafts 12 and 13, or the roughly shaped parts, are machined to form mount surfaces a, b, c, d and e for fitting thereon such parts as oil seals 15, bearings 14, a propeller 18 and a pulley 16. As a result of this arrangement, a propeller shaft M which is highly accurate as a whole can be produced efficiently. Thus, the invention should be of great use.

What is claimed is:

1. A method of producing propeller shafts for jet-propelled small-sized boats, comprising the steps of preparing a main shaft in the form of a hollow round bar, which is a finished part and a pair of auxiliary shafts shorter in length than said main shaft, in the form of solid round bars, which are roughly shaped parts, connecting and integrating said pair of auxiliary shafts with the opposite cut ends of said main shaft by the friction welding process utilizing heat of friction produced by relative pressurized rubbing movement between said parts, and, with said main shaft, which is a finished part, used as a standard, machining the surfaces of said auxiliary shafts, which are roughly shaped parts, to form mount surfaces for fitting thereon such parts as oils seals, bearings, and a propeller.

* * * * *